(12) United States Patent
Qu et al.

(10) Patent No.: US 11,811,697 B2
(45) Date of Patent: *Nov. 7, 2023

(54) METHOD AND APPARATUS FOR SEQUENCE DISTRIBUTING AND SEQUENCE PROCESSING IN COMMUNICATION SYSTEM

(71) Applicant: HUAWEI TECHNOLOGIES CO., LTD., Guangdong (CN)

(72) Inventors: Bingyu Qu, Beijing (CN); Yujuan He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/006,790

(22) Filed: Aug. 29, 2020

(65) Prior Publication Data

US 2021/0119752 A1  Apr. 22, 2021

Related U.S. Application Data

(63) Continuation of application No. 16/419,008, filed on May 22, 2019, now Pat. No. 10,764,011, which is a
(Continued)

(30) Foreign Application Priority Data

Sep. 30, 2006 (CN) .......................... 200610159666.7
Dec. 30, 2006 (CN) .......................... 200610173364.5
(Continued)

(51) Int. Cl.
*H04L 5/00* (2006.01)
*H04J 13/00* (2011.01)
(Continued)

(52) U.S. Cl.
CPC ........ *H04L 5/0053* (2013.01); *H04J 13/0062* (2013.01); *H04J 13/22* (2013.01);
(Continued)

(58) Field of Classification Search
CPC ... H04L 5/0053; H04L 5/0005; H04L 5/0048; H04L 5/0062; H04L 5/0073; H04L 23/02;
(Continued)

(56) References Cited

U.S. PATENT DOCUMENTS 5,652,494 A  7/1997 Sugden
6,084,884 A  7/2000 Adachi
(Continued)

FOREIGN PATENT DOCUMENTS

CN  1688145 A  10/2005
CN  1728622 A  2/2006
(Continued)

OTHER PUBLICATIONS

3GPP RAN1 LTE Ad Hoc meeting R1-060152, "Consideration on UL RACH scheme for LTE," Nortel, Jan. 23-25, 2006, total 8 pages.
(Continued)

*Primary Examiner* — Khai M Nguyen
(74) *Attorney, Agent, or Firm* — Fish & Richardson P.C.

(57) ABSTRACT

A sequence distributing and sequence processing method and apparatus in a communication system are provided. The sequence distributing method includes the following steps: generating sequence groups including a number of sequences, the sequences in the sequence groups are determined according to the sequence time frequency resource occupation manner which is supported by the system; distributing the sequence groups to cells. The method avoids the phenomenon that signaling transmission is needed to distribute the sequences to the cells for different time frequency resource occupation manner, and saves in so far as
(Continued)

possible the wireless network transmission resource occupied during the process of distributing the sequences through distributing the sequence groups comprising a number of sequences to the cells.

20 Claims, 4 Drawing Sheets

Related U.S. Application Data continuation of application No. 15/045,270, filed on Feb. 17, 2016, now Pat. No. 10,305,661, which is a continuation of application No. 12/413,105, filed on Mar. 27, 2009, now Pat. No. 9,294,245, which is a continuation of application No. PCT/CN2007/070774, filed on Sep. 25, 2007.

(30) Foreign Application Priority Data

| Mar. 7, 2007 | (CN) | .................. 200710073057.4 |
| Jun. 19, 2007 | (CN) | .................. 200710111533.7 |

(51) Int. Cl.

| H04J 13/22 | (2011.01) |
| H04L 23/02 | (2006.01) |
| H04W 88/02 | (2009.01) |
| H04L 25/02 | (2006.01) |

(52) U.S. Cl.
CPC .......... *H04L 5/0005* (2013.01); *H04L 5/0048* (2013.01); *H04L 5/0062* (2013.01); *H04L 5/0073* (2013.01); *H04L 23/02* (2013.01); *H04L 25/0226* (2013.01); *H04W 88/02* (2013.01)

(58) Field of Classification Search
CPC ... H04L 25/0226; H04J 13/0063; H04J 13/22; H04W 88/02
See application file for complete search history.

(56) References Cited

U.S. PATENT DOCUMENTS

| 6,226,337 | B1 | 5/2001 | Klank et al. |
| 6,990,087 | B2 | 1/2006 | Rao et al. |
| 7,072,462 | B2 | 1/2006 | Smith et al. |
| 7,417,964 | B2 | 8/2008 | Cho et al. |
| 7,508,842 | B2 | 3/2009 | Baum et al. |
| 7,539,263 | B2 | 5/2009 | Jung et al. |
| 7,545,772 | B2 | 6/2009 | Hwang et al. |
| 7,558,237 | B2 | 7/2009 | Mottier et al. |
| 7,599,327 | B2 | 10/2009 | Zhuang |
| 7,643,832 | B2 | 1/2010 | Cudak et al. |
| 7,701,919 | B2 | 4/2010 | Lee |
| 7,746,916 | B2 | 6/2010 | Han et al. |
| 7,792,212 | B2 | 9/2010 | Lee et al. |
| 7,808,884 | B2 | 10/2010 | Jitsukawa et al. |
| 7,881,364 | B2 | 2/2011 | Noh et al. |
| 7,965,797 | B2 | 6/2011 | Kwasinski et al. |
| 7,983,143 | B2 | 7/2011 | Akita et al. |
| 8,019,025 | B2 | 9/2011 | Im et al. |
| 8,036,197 | B2 | 10/2011 | Pajukoski et al. |
| 8,054,919 | B2 | 11/2011 | Xin et al. |
| 8,111,732 | B2 | 2/2012 | Noh et al. |
| 8,130,863 | B2 | 3/2012 | Han et al. |
| 8,134,913 | B1 | 3/2012 | Gerakoulis et al. |
| 8,155,656 | B2 | 4/2012 | Ogawa et al. |
| 8,165,159 | B2 | 4/2012 | Oketani et al. |
| 8,218,481 | B2 | 7/2012 | Kwon et al. |
| 8,223,816 | B2 | 7/2012 | Kishiyama et al. |
| 8,223,819 | B2 | 7/2012 | Hsieh et al. |
| 8,233,415 | B2 | 7/2012 | Birru |
| 8,234,325 | B2 | 7/2012 | Lee et al. |
| 8,290,021 | B2 | 10/2012 | Noh et al. |
| 8,290,502 | B2 | 10/2012 | Ogawa et al. |
| 8,773,968 | B2 | 7/2014 | Jiang et al. |
| 8,780,690 | B2 * | 7/2014 | Akita .................. H04L 27/2613 370/208 |
| 8,787,181 | B2 * | 7/2014 | Gaal ...................... H04J 13/16 370/252 |
| 9,143,295 | B2 | 9/2015 | Qu et al. |
| 9,660,853 | B2 | 5/2017 | Shimomura et al. |
| 10,305,661 | B2 * | 5/2019 | Qu ........................ H04L 5/0048 |
| 10,764,011 | B2 * | 9/2020 | Qu ........................ H04L 5/0005 |
| 2003/0156624 | A1 | 8/2003 | Koslar |
| 2004/0066740 | A1 | 4/2004 | Suh et al. |
| 2005/0058089 | A1 | 3/2005 | Vijayan et al. |
| 2005/0090202 | A1 | 4/2005 | Kim et al. |
| 2005/0111522 | A1 | 5/2005 | Sung et al. |
| 2005/0226140 | A1 | 10/2005 | Zhuang et al. |
| 2005/0286465 | A1 | 12/2005 | Zhuang |
| 2006/0009227 | A1 | 1/2006 | Cudak et al. |
| 2006/0039451 | A1 | 2/2006 | Zhuang et al. |
| 2006/0045001 | A1 | 3/2006 | Jalali |
| 2006/0050799 | A1 | 3/2006 | Hou et al. |
| 2006/0056528 | A1 | 3/2006 | Jung et al. |
| 2006/0188036 | A1 | 8/2006 | Brunel et al. |
| 2006/0291431 | A1 | 12/2006 | Pajukoski et al. |
| 2007/0153834 | A1 | 7/2007 | Qu et al. |
| 2007/0165567 | A1 | 7/2007 | Tan et al. |
| 2007/0177682 | A1 | 8/2007 | Han et al. |
| 2007/0183386 | A1 * | 8/2007 | Muharemovic ......... H04L 5/023 370/344 |
| 2007/0237113 | A1 | 10/2007 | Akita et al. |
| 2007/0253465 | A1 | 11/2007 | Muharemovic et al. |
| 2007/0254685 | A1 | 11/2007 | Oketani et al. |
| 2008/0037487 | A1 | 2/2008 | Li et al. |
| 2008/0080472 | A1 | 4/2008 | Bertrand et al. |
| 2008/0090528 | A1 | 4/2008 | Malladi |
| 2008/0101313 | A1 | 5/2008 | Choi et al. |
| 2008/0123616 | A1 | 5/2008 | Lee |
| 2008/0165893 | A1 | 7/2008 | Malladi et al. |
| 2008/0212555 | A1 | 9/2008 | Kim et al. |
| 2008/0232486 | A1 | 9/2008 | Kowalski |
| 2008/0235314 | A1 | 9/2008 | Lee |
| 2008/0240024 | A1 | 10/2008 | Rao et al. |
| 2008/0273582 | A1 | 11/2008 | Gaal et al. |
| 2008/0285433 | A1 | 11/2008 | Akita et al. |
| 2008/0285534 | A1 | 11/2008 | Dent |
| 2008/0310383 | A1 | 12/2008 | Kowalski |
| 2008/0316961 | A1 | 12/2008 | Bertrand et al. |
| 2009/0046645 | A1 | 2/2009 | Bertrand et al. |
| 2009/0080500 | A1 | 3/2009 | Muharemovic et al. |
| 2009/0097465 | A1 | 4/2009 | Inoue et al. |
| 2009/0103484 | A1 | 4/2009 | Shu et al. |
| 2009/0116587 | A1 | 5/2009 | Kwasinski et al. |
| 2009/0175228 | A1 | 7/2009 | Kimura et al. |
| 2009/0180443 | A1 | 7/2009 | Kawasaki et al. |
| 2009/0186625 | A1 | 7/2009 | Qu et al. |
| 2009/0196279 | A1 | 8/2009 | Kim et al. |
| 2009/0252112 | A1 | 10/2009 | Shimomura et al. |
| 2009/0323855 | A1 | 12/2009 | Han et al. |
| 2009/0323868 | A1 | 12/2009 | Alt |
| 2010/0284265 | A1 | 11/2010 | Ogawa et al. |
| 2011/0007715 | A1 | 1/2011 | Kwon et al. |
| 2011/0085515 | A1 | 4/2011 | Qu et al. |
| 2011/0134968 | A1 | 6/2011 | Han et al. |
| 2011/0189951 | A1 | 8/2011 | Noh et al. |
| 2011/0249549 | A1 | 10/2011 | Hao et al. |
| 2012/0039256 | A1 | 2/2012 | Kwon |
| 2012/0069933 | A1 | 3/2012 | Hao et al. |
| 2012/0113931 | A1 | 5/2012 | Inoue et al. |
| 2012/0163348 | A1 | 6/2012 | Han et al. |
| 2012/0170538 | A1 | 7/2012 | Oketani et al. |
| 2012/0263214 | A1 * | 10/2012 | Lee ........................ H04J 13/14 375/219 |
| 2012/0269159 | A1 | 10/2012 | Inoue et al. |
| 2013/0201982 | A1 | 8/2013 | McCoy |
| 2015/0189632 | A1 | 7/2015 | Inoue et al. |
| 2017/0170922 | A1 | 6/2017 | Noh et al. |

(56) References Cited

U.S. PATENT DOCUMENTS

| | | | |
|---|---|---|---|
| 2017/0366290 | A1 | 12/2017 | Noh et al. |
| 2018/0076980 | A1 | 3/2018 | Iwai et al. |
| 2018/0131481 | A1 | 5/2018 | Jiang et al. |
| 2021/0391962 | A1* | 12/2021 | Oketani .............. H04J 13/0062 |

FOREIGN PATENT DOCUMENTS

| | | | | |
|---|---|---|---|---|
| CN | 1728695 | A | 2/2006 | |
| CN | 1747354 | A | 3/2006 | |
| CN | 1773897 | A | 5/2006 | |
| CN | 1815916 | A | 8/2006 | |
| CN | 1852274 | A | 10/2006 | |
| CN | 1889754 | A | 1/2007 | |
| CN | 101027868 | A | 8/2007 | |
| CN | 101039499 | A | 9/2007 | |
| CN | 101179819 | A | 5/2008 | |
| CN | 101262687 | A | 9/2008 | |
| CN | 101366193 | A | 2/2009 | |
| CN | 1337105 | A | 2/2022 | |
| EP | 0786889 | A1 | 7/1997 | |
| EP | 1976137 | A1 | 10/2008 | |
| EP | 2068455 | A1 | 6/2009 | |
| EP | 2360851 | A2 | 8/2011 | |
| JP | 2007194751 | A | 8/2007 | |
| JP | 2007336437 | A | 12/2007 | |
| JP | 2008092051 | A | 4/2008 | |
| JP | 2009245238 | A | 10/2009 | |
| JP | 2010506443 | A | 2/2010 | |
| JP | 1606494 | B2 | 1/2011 | |
| JP | 1968256 | B2 | 7/2012 | |
| JP | 1995914 | B2 | 8/2012 | |
| JP | 5647177 | B2 | 12/2014 | |
| PH | 12009500618 | B1 * | 4/2008 | |
| PH | 12009500618 | B1 * | 12/2012 | .............. H04B 1/38 |
| TW | 291622 | B | 11/1996 | |
| WO | WO9507581 | A1 | 3/1995 | |
| WO | WO2005043794 | A2 | 5/2005 | |
| WO | WO2006020483 | A2 | 2/2006 | |
| WO | WO2007122828 | A1 | 11/2007 | |
| WO | WO2007141848 | A1 | 12/2007 | |
| WO | WO-2008044553 | A1 * | 4/2008 | .............. H04J 13/22 |
| WO | 2008053971 | A1 | 5/2008 | |
| WO | WO2008094014 | A2 | 8/2008 | |

OTHER PUBLICATIONS

3GPP RAN1 meeting #44 R1-060653, "Consideration on UL RACH scheme for LTE," Nortel Networks, Feb. 13-17, 2006, total 10 pages.
3GPP TS 36.211 V0.3.1, 3rd Generation Partnership Project; Technical Specification Group Radio Access Network; Physical Channels and Modulation (Release 8 ), Feb. 2007, total 28 pages.
3GPP TS 36.211 V1.0.0 (RP-070169), 3rd Generation Partnership Project; Technical Specification Group Radio Access Network; Physical Channels and Modulation (Release 8), Mar. 2007, total 30 pages.
3GPP TSG-RAN WG1 LTE ad-hoc R1-061790, "RACH Preamble Design," Qualcomm, Europe, Jun. 27-30, 2006, total 3 pages.
3GPP TSG-RAN WG1 Meeting #45 R1-061193, "Multiplexing Method for Orthogonal Reference Signals for E-UTRA Uplink," NTT DOCOMO, May 8-12, 2006, total 13 pages.
3GPP TSG-RAN WG1 Meeting #46 R1-062104, "Group-wised Frequency Resource Allocation for Frequency Domain Channel dependent Scheduling in SC-Based E-UTRA Uplink," NTT DOCOMO et al., Aug. 28-Sep. 1, 2006, total 13 pages.
3GPP TSG RAN LTE Ad Hoc R1-061816, "Expanded sets of ZCZ-GCL random access preambles," Huawei, Jun. 27-30, 2006, total 5 pages.
3GPP TSG RAN WG1 # 48bis R1-071542, "Binding method for UL RS sequence with different lengths," LG Electronics, Mar. 26-30, 2007, total 4 pages.

3GPP TSG RAN WG1 #45 R1-061176, "EUTRA SC-FDMA Uplink Pilot/Reference Signal Design and TP," Motorola, May 8-May 12, 2006, total 8 pages.
3GPP TSG RAN WG1 #46bis R1-062642, "Uplink Reference Signal Design in EUTRA," Texas Instruments, Oct. 9-13, 2006, total 10 pages.
3GPP TSG RAN WG1 #48 R1-070911, "Binding method for UL RS sequence with different lengths," LG Electronics, Feb. 12-16, 2007, total 12 pages.
3GPP TSG RAN WG1 LTE Ad Hoc Meeting R1-061897, "Design of non-synchronized random access using CDM for E-UTRA," InterDigital, Jun. 27-30, 2006, total 6 pages.
3GPP TSG RAN WG1 LTE Ad Hoc R1-061678, "Pilot Sequence Allocation Method in E-UTRA Uplink," NTT DOCOMO at al., Jun. 27-30, 2006, total 6 pages.
3GPP TSG RAN WG1 LTE Ad Hoc R1-061749, "Non synchronized Random Access structure and performance for E-UTRA," Texas Instruments, Jun. 27-30, 2006, total 14 pages.
3GPP TSG RAN WG1 meeting #47bis R1-070367, "Sequence Allocation Method for E-UTRA Uplink Reference Signal," Huawei, Jan. 15-19, 2007, total 3 pages.
3GPP TSG RAN WG1 Meeting #43 R1-051432, "Pilot structure of SC-FDMA in Evolved UTRA uplink," Huawei, Nov. 7-11, 2005, total 3 pages.
3GPP TSG RAN WG1 Meeting #44 R1-060319 (Original R1-060046), "Orthogonal Pilot Channel Structure for EUTRA Uplink," NTT DOCOMO et al., Feb. 13-17, 2006, total 7 pages.
3GPP TSG RAN WG1 Meeting #46 R1-062103, "Pilot Sequence Allocation Method in E-UTRA Uplink," NTT DOCOMO et al., Aug. 28-Sep. 1, 2006, total 6 pages.
3GPP TSG RAN WG1 Meeting #46bis R1-062728 (Original R1-061678), Reference Signal Sequence Allocation Method in E-UTRA Uplink, NTT DOCOMO et al., Oct. 9-13, 2006, total 7 pages.
3GPP TSG RAN WG1 Meeting #47 R1-063356, "Sequence Assignment for Uplink Reference Signal," Huawei, Nov. 6-10, 2006, total 3 pages.
3GPP TSG RAN WG1 Meeting #48 R1-071109, "Sequence Allocation Method for E-UTRA Uplink Reference signal," Huawei, Feb. 12-16, 2007, total 3 pages.
3GPP TSG RAN WG1 Meeting #48bis R1-071643, "Sequence Hopping and Cyclic-Shift Value Hopping for Uplink Reference Signal in E-UTRA," NTT DOCOMO et al., Mar. 26-30, 2007, total 4 pages.
3GPP TSG RAN1 #44bis R1-060884, "Random Access Sequence Design," Motorola, Mar. 24-26, 2006, total 6 pages.
3GPP TSG-RAN WG1 LTE Ad hoc meeting R1-061766, "Random access burst design for E-UTRA," Panasonic, Jun. 27-30, 2006, total 5 pages.
3GPP TSG-RAN WG1 LTE AdHoc R1-061869 ,"Comparison of Zero Cross-Correlation sequences and Zadoff-Chu Sequences for E-UTRA RACH," Ericsson, Jun. 27-30, 2006, total 6 pages.
3GPP TSG-RAN WG1 Meeting #46 R1-062174,"Random access sequence comparison for E-UTRA," Panasonic et al., Aug. 28-Sep. 1, 2006, total 6 pages.
3GPP TSG-RAN WG1 Meeting #46 R1-062175, "Random access burst design for E-UTRA," Panasonic et al., Aug. 28-Sep. 1, 2006, total 9 pages.
Branislav M. Popvic et al., "Random Access Preambles for Evolved UTRA Cellular System," 2006 IEEE Ninth International Symposium on Spread Spectrum Techniques and Applications, total 6 pages.
CATT, RITT, "On the preamble sequence design for non-synchronized RACH for E-UTRA TDD [online]," 3GPP TSG-RAN WG1 # 46, Tallinn, Estonia, Aug. 28-Sep. 1, 2006, R1-062430, Sep. 2, 2006, 8 pages.
Definition of Zadoff-Chu ( CAXAC) sequence, from Wikipedia: the free encyclopedia, total 1 page.
E1 3GPP RAN WG1 #46 R1-062073, "EUTRA SC-FDMA Uplink Pilot / Reference Signal Design and TP," Motorola, Aug. 28-Sep. 1, 2006, total 6 pages.

(56) References Cited

OTHER PUBLICATIONS

E2 3GPP TR 25.814 V7.0.0, 3rd Generation Partnership Project;Technical Specification Group Radio Access Network; Physical layer aspects for evolved Universal Terrestrial Radio Access (UTRA)(Release 7), Jun. 2006, total 100 pages.
E3 3GPP TR 25.814 V7.1.0, 3rd Generation Partnership Project; Technical Specification Group Radio Access Network; Physical layer aspects for evolved Universal Terrestrial Radio Access (UTRA) (Release 7), Sep. 2006, total 132 pages.
E4 3GPP TSG RAN WG1 Meeting #46 R1-062388," CAZAC Reference Signal for SC-FDMA," Lucent Technologies, Aug. 28-Sep. 1, 2006, total 12 pages.
E5 3GPP TSG RAN WG1 #48 R1-070911, "Binding method for UL RS sequence with different lengths,", LG Electronics, Feb. 12-16, 2007, total 4 pages.
E6 3GPP TSG RAN1 #47 R1-063434, "UL Reference Signal Design" , Qualcomm, Europe, Nov. 6-10, 2006, total 6 pages.
E7 3GPP TSG-RAN WG1 LTE adhoc R1-061876 ,"Precoded FDM Reference Signals for SC-FDMA," Lucent Technologies, Jun. 27-30, 2006, total 8 pages.
E8 3GPP TSG RAN WG1 Meeting #46 R1-062101 (Original R1-061193), "Multiplexing Method for Orthogonal Reference Signal for E-UTRA Uplink," NTT DOCOMO et al., Aug. 28-Sep. 1, 2006, total 14 pages.
E9 3GPP TSG RAN WG1 Meeting # 46 R1-062299, "E-UTRA SC-FDMA Uplink Reference Signal Design," CATT, Aug. 28-Sep. 1, 2006, total 6 pages.
E10 Printout of the webpage "3GPP specification 25.814" as retrieved on Feb. 13, 2014, total 2 pages.
E11 Printout of the webpage "3GPP meeting details" as retrieved on Feb. 13, 2014, total 4 pages.
E12 Printout of the webpage "3GPP Meeting Registration" as retrieved on Feb. 13, 2014, total 6 pages.
E13 3GPP TS 36.300 V8.3.0, 3rd Generation Partnership Project; Technical Specification Group Radio Access Network ; Evolved Universal Terrestrial Radio Access (E-UTRA) and Evolved Universal Terrestrial Radio Access Network (E-UTRAN); Overall description; Stage 2 (Release 8), Dec. 2007, total 120 pages.
E13 Printout of the webpage "www.3gpp.org-ftp-tsg_ran-TSG_RAN_TSGR_33" as retrieved on Feb. 13, 2014, total 1 page.
E14 3GPP TS 33.401 V2.0.0, 3rd Generation Partnership Project; Technical Specification Group Services and System Aspects; 3GPP System Architecture Evolution (SAE): Security Architecture; (Release 8), May 2008, total 45 pages.
E14 Printout of the webpage "www.3gpp.org-ftp-tsg_ran_TSG_RAN_TSGR_33" as retrieved on Feb. 13, 2014, total 4 pages.
E15 3GPP TS 33.401 V1.1.0, 3rd Generation Partnership Project; Technical Specification Group Services and System Aspects; 3GPP System Architecture Evolution (SAE): Security Architecture; (Release 8), Apr. 2008, total 1 page.
E15 Printout of the webpage "3GPP TDocs (written contributions) at meeting" as retrieved on Feb. 13, 2014, total 4 pages.
E16 Overview of the documents comprised in the written contribution "RP-060496" to the RP-33 meeting, Sep. 19, 2006 to Sep. 22, 2006, total 1 page.
E17 3GPP TSG-RAN1 Meeting #46 Tdoc R1-062424, "DL MIMO System Analysis," Change Request 25.814 CR 0003 V7.0.0, Aug. 28-Sep . 1, 2006, total 4 pages.
E18 3GPP TSG-RAN WG1 Meeting #46 Tdoc R1-062442, "Summary of downlink enhancement techniques over reference LTE unicast performance," Change Request 25.814 CR 0010 V7.0.0 , Aug. 28-Sep. 1, 2006, total 3 pages.
E19 3GPP TSG-RAN1 Meeting #46 Tdoc R1-062412, "DL and UL VoIP capacity characterization for E-UTRA," Change Request 25.814 CR 0004 V7.0.0, Aug. 28-Sep. 1, 2006, total 6 pages.
E20 3GPP TSG-RAN WG1 Meeting #46 Tdoc R1-062413, "Inclusion of Beamforming Results in TR25.814," Change Request 25.814 CR 0008 V7.0.0 , Aug. 28-Sep. 1, 2006, total 6 pages.
Exhibit 239-1, Samsung's Invalidity Contentions for U.S. Pat. No. 8,644,239 ("# 239 Patent") in View of 3GPP TSG RAN WG1 Meeting # 48 , Document R1-071109 ("R1-071109"), Jan. 20, 2017, total 16 pages.
Exhibit 239-2 , Samsung's Invalidity Contentions for U.S. Pat. No. 8,644,239 ("239 Patent ") in View of 3GPP TSG RAN WG1 Meeting # 47, Document R1-063356 ( "R1-063356 "), Jan. 20, 2017, total 14 pages.
Exhibit 239-3 , Samsung's Invalidity Contentions for U.S. Pat. No. 8,644,239 (# 239 Patent ) in View of U.S. Pat. No. 7,599,327 to Zhuang ("Zhuang' 327 "), Jan. 20, 2017, total 20 pages.
Exhibit 239-4 , Samsung's Invalidity Contentions for U.S. Pat. No. 8,644,239 ("239 Patent ") in View of U.S. Patent App. Pub. No. 2006/0009227 ("Cudak "), Jan. 20, 2017, total 16 pages.
Exhibit 239-5, Samsung's Invalidity Contentions for U.S. Pat. No. 8,644,239 ( "239 Patent ") in View of 3GPP TSG RAN WG1 Meeting # 46, Document R1-062174 ( "R1-062174 "), Jan. 20, 2017, total 25 pages.
Exhibit 239-6, Samsung's Invalidity Contentions for U.S. Pat. No. 8,644,239 ("239 Patent") in View of U.S. Patent App. Pub. No. 2006/0039451 ("Zhuang 451 "), Jan. 20, 2017, total 35 pages.
Exhibit 239-7, Samsung's Invalidity Contentions for U.S. Pat. No. 8,644,239 (239 Patent) in View of 3GPP TSG RAN WG1 Meeting # 48bis, Document R1-071643 ( "R1-071643"), Jan. 20, 2017, total 27 pages.
Exhibit 239-B, "Motivation to Combine References," Jan. 20, 2017, total 70 pages.
IEEE 802.16 Broadband Wireless Access Working Group, "GCL based preamble design for 1024,512 and 128 FFT sizes in the OFDMA PHY layer," IEEE C80216e-04/241r1, Aug. 29, 2004, total 30 pages.
John C.L. Ng et al., " Multi-phase Optimal Sequences for Fast Initialization of Channel Estimation and Equalization," Communications, 1997. ICC '97 Montreal, Towards the Knowledge Millennium, 1997 IEEE International Conference on Montreal, Quebec, Canada, Jun. 8-12, 1997, total 4 pages.
LG Electronics, "Detailed Statement," Feb. 2, 2007, with English translation, total 27 pages.
Ping et al., "Mashup Technology and Online Learning," Department of Education and Information Technology, East China Normal University, Shanghai, China, 2008, total 6 pages.
Samsung et al., "Samsung's Patent Local Rule 3-3 and 3-4 Disclosures," Case No. 16-cv-02787-WHO, Jan. 20, 2017, total 13 pages.
U.S. Appl. No. 60/888,065, filed Feb. 2, 2007, Kwon et al.

* cited by examiner

METHOD AND APPARATUS FOR SEQUENCE DISTRIBUTING AND SEQUENCE PROCESSING IN COMMUNICATION SYSTEM

CROSS REFERENCE TO RELATED APPLICATIONS

This application is a continuation of U.S. patent application Ser. No. 16/419,008, filed on May 22, 2019, which is a continuation of U.S. patent application Ser. No. 15/045,270, filed on Feb. 17, 2016, now U.S. Pat. No. 10,305,661. U.S. patent application Ser. No. 15/045,270 is a continuation of U.S. patent application Ser. No. 12/413,105, filed on Mar. 27, 2009, now U.S. Pat. No. 9,294,245. U.S. patent application Ser. No. 12/413,105 is a continuation of International Application No. PCT/CN2007/070774, filed on Sep. 25, 2007. The International Application No. PCT/CN2007/070774 claims priority to Chinese Patent Application No. 200610159666.7, filed on Sep. 30, 2006, Chinese Patent Application No. 200610173364.5, filed on Dec. 30, 2006, Chinese Patent Application No. 200710073057.4, filed on Mar. 7, 2007, and Chinese Patent Application No. 200710111533.7, filed on Jun. 19, 2007. All of the aforementioned patent applications are hereby incorporated by reference in their entireties.

FIELD OF THE INVENTION

The present invention relates to communication technology, and in particular, to a sequence allocating method, a sequence processing method and a sequence processing apparatus in a communication system.

BACKGROUND OF THE INVENTION

Constant amplitude zero auto-correlation (CAZAC) sequence has following characteristics: (1) the module of the amplitude is a constant. For example, the module may be normalized to 1; and (2) a zero period auto-correlation. Except for the maximum correlation value with respect to the sequence itself, the sequence has a correlation value of zero with respect to other cyclic shifts.

For a sequence with above characteristics, a sequence in the frequency domain obtained through Fourier transformation is also a CAZAC sequence, i.e., the sequence in the frequency domain also has the characteristics of constant amplitude and zero auto-correlation.

Due to the above characteristics of the CAZAC sequence, much attention is gradually paid to the CAZAC sequence during the design of a communication system. A signal bearing the CAZAC sequence is widely employed in the communication system. For example, in a Single Carrier Frequency Division Multiple Access (SC-FDMA) system, within one symbol time, the sequence is modulated on each sub-carrier for transmission. When the sequence of the transmitted signal is known at a receiver, the receiver may perform channel estimation by use of the received signal. Because the CAZAC sequence has constant amplitude in the time domain, the waveform shows small peak-to-average ratio in the time domain, and is easy to be transmitted by the transmitter.

Meanwhile, because the transmitted signal has the same amplitude on each sub-carrier in the frequency domain, the receiver may fairly estimate the channel fading on each sub-carrier, and the estimation performance may not be affected because of relatively small amplitude of the signal on a sub-carrier.

At present, the method for allocating the CAZAC sequence for cells is as follows: the CAZAC sequence is allocated once with respect to each occupation mode of time-frequency resources of the sequence. Furthermore, when the occupation modes of the time-frequency resources of the CAZAC sequence to be allocated are the same in different cells, different CAZAC sequences having the same length and having small inter-sequence correlation value are allocated to the different cells. Thus, the signal interference between different cells is less. For example, as shown in FIG. 1, the occupation modes of the time-frequency resources of the sequence in cell A and cell B overlap each other totally, then CAZAC sequences having the same length are allocated for cell A and cell B respectively, where the two CAZAC sequences have low correlation, so that the signal interference between cell A and cell B may be avoided.

SUMMARY OF THE INVENTION

An embodiment of the present invention provides a method for allocating sequences in a communication system. The method includes: generating a sequence group including a plurality of sequences, wherein the sequences in the sequence group are determined according to occupation modes of time-frequency resources of the sequences supported in the system; and allocating the sequence group to a cell.

An embodiment of the present invention further provides a sequence processing method in a communication system. The method includes: determining information of the sequence group allocated to a cell; determining sequence generation information from the information of the sequence group according to the occupation mode of time-frequency resources of the sequence; generating the sequence according to the sequence generation information; and performing sequence processing on the sequence generated.

An embodiment of the present invention further provides a wireless communication apparatus for signal processing. The apparatus includes: a cell sequence determining unit, adapted to determine the information of sequence group allocated to the cell; a time-frequency resource of the sequence determining unit, adapted to determine sequence generation information from the information of the sequence group according to the occupation mode of time-frequency resources of the sequence; a sequence generating unit, adapted to generate the sequence according to the sequence generation information; and a processing unit, adapted to perform sequence processing on the sequence generated.

In the technical solution provided by the embodiments of the present invention, a sequence group containing a plurality of sequences is allocated to a cell, so that the phenomenon that the allocation of the sequence for the cell needs to be implemented via signaling transmission with respect to different occupation modes of time-frequency resources is avoided, and the wireless network transfer resources occupied during the process of sequence allocation may be saved.

DETAILED DESCRIPTION OF THE EMBODIMENTS

The embodiments of the invention are described as follows in conjunction with the drawings.

There are at least following two problems in the conventional art:

1. Large numbers of wireless network resources are occupied. In the existing method for allocating the CAZAC sequence, when a CAZAC sequence processing is to be performed, the allocation of CAZAC sequence for the cell needs to be implemented via signaling transmission with respect to each occupation mode of time-frequency resources, and the signaling for allocation of CAZAC sequence for the cell occupies large numbers of the wireless network resources.

Figure 1:
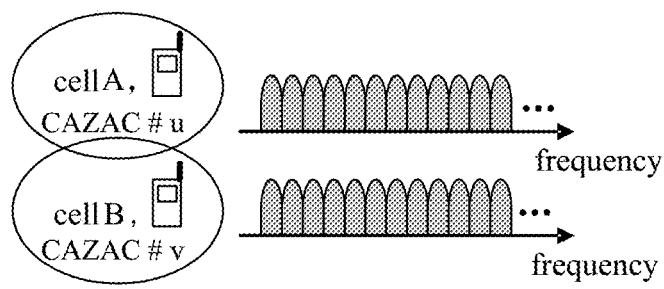
FIG. 1 is a schematic diagram showing that the occupation modes of time-frequency resources of the sequence in different cells overlap totally each other in the conventional art.
Figure 2:
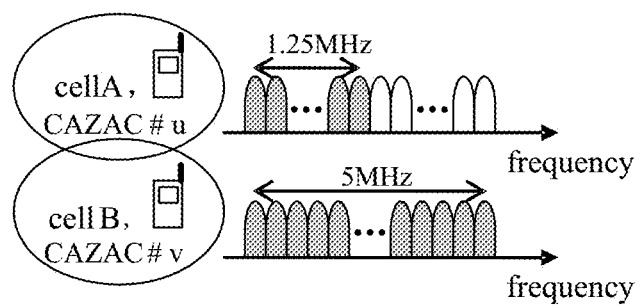
FIG. 2 is a first schematic diagram showing that the occupation modes of time-frequency resources of the sequence in different cells overlap partially each other in the conventional art.
Figure 3:
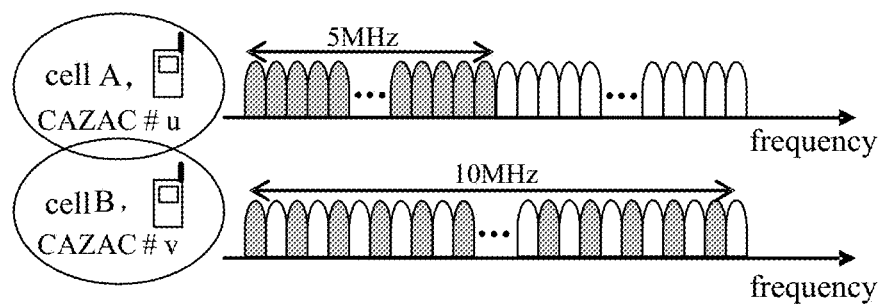
FIG. 3 is a second schematic diagram showing that the occupation modes of time-frequency resources of the sequence in different cells overlap totally each other in the conventional art.

2. If it is not considered that when the occupation modes of time-frequency resources of the CAZAC sequences in different cells partially overlap each other, relatively strong signal interference may exist between the cells. In the existing procedure of CAZAC sequence allocation, when the occupation modes of time-frequency resources of the CAZAC sequences to be allocated in different cells are not totally the same, it is considered that strong signal interference may not be produced between the cells. Therefore, during the CAZAC sequence allocation, the correlation between the CAZAC sequences corresponding to different occupation modes of time-frequency resources allocated to different cells is not considered. For example, as shown in FIG. 2 and FIG. 3, in the case that the occupation modes of time-frequency resources of the sequences in cell A and cell B partially overlap each other, when the correlation value of the CAZAC sequences allocated to cell A and cell B is relatively high, there is relatively strong signal interference between cell A and cell B.

In the embodiments of the invention, a system allocates a sequence group to a cell, where the sequences in each sequence group are divided into several sub-groups. Each sub-group corresponds to an occupation mode of time-frequency resources. The number of sub-group is the same as that of the occupation mode of time-frequency resources in the communication system. The sequences in each sub-group are obtained by selecting from a set of candidate sequences corresponding to the sub-group. A user or channel selects a sequence in the corresponding sequence sub-group for transmitting or receiving according to the allocated sequence group and the occupation mode of time-frequency resources of the employed specific transmission signal. There may be one or more sequences in one sub-group.

Figure 4:
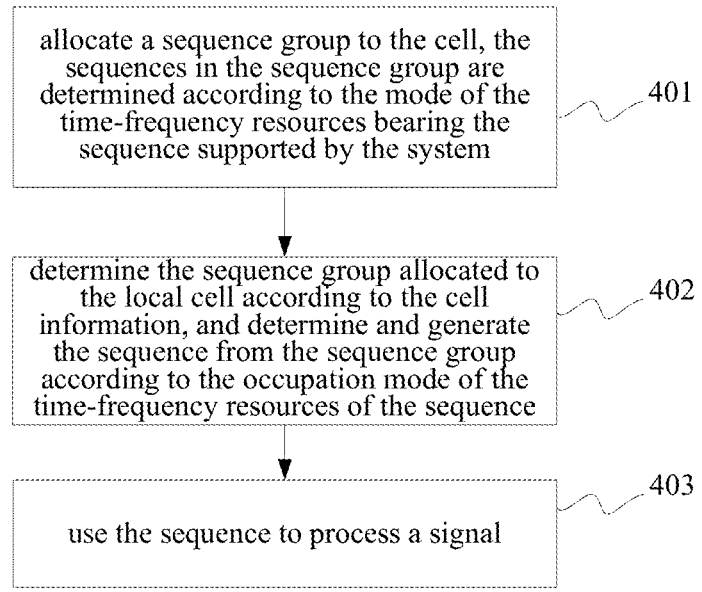
FIG. 4 is a schematic diagram showing the flow of a sequence allocating and processing method according to an embodiment of the present invention.

FIG. 4 is a schematic diagram showing the flow of a sequence allocating and processing method in the communication system according to an embodiment of the invention.

As shown in FIG. 4, in Step 401, the sequence group including a plurality of sequences is generated, and one or more sequence groups including the plurality of sequences are allocated for a cell. The sequences in the sequence group are determined according to the occupation mode of time-frequency resources of the sequence supported by the system. The occupation mode of time-frequency resources of the sequence is the mode of time-frequency resources bearing the sequence, i.e., the correspondence relation between the sequence and the time-frequency resources. By allocating the sequence group including the plurality of sequences for the cell, the allocated sequence group may be notified through the identification information of the cell or the identification information of the sequence group, so that the phenomenon that the allocation of the sequence for the cell needs to be implemented via signaling transmission with respect to different occupation modes of time-frequency resources is avoided, and the wireless network transfer resources occupied during sequence allocation is saved.

For different time-frequency resources that may be occupied by the sequences to be transmitted, the constitution method of the plurality of sequences in the sequence group provided by the solution according to the invention includes ensuring that these sequences have the following characteristic:

When these sequences occupy the corresponding time-frequency resources, the correlation between these sequences are relatively high.

In other words, when occupying the corresponding time-frequency resources, the sequences having relatively high correlation between each other constitute a group.

When different groups are constituted according to the above principle, it can be ensured that the sequences in different groups have relatively small correlation between each other after the sequences occupy the corresponding time-frequency resources.

Then the flow goes to Step 402. The function of allocating the sequence group for the cell includes allocating the sequence group for the user or channel in the cell.

When a user terminal needs to perform a sequence processing, such as transmitting the sequence, in Step 402, the user terminal determines the sequence group allocated to the present cell, determines the information of the sequence to be transmitted in the sequence group of the present cell according to the occupation mode of time-frequency resources of the sequence that needs to be transmitted, and then generates the corresponding sequence according to the information of the sequence that needs to be transmitted. For example, the user terminal determines the identification information of the sequence that needs to be transmitted, and generates the corresponding sequence according to the identification information. In the present step, the user terminal may determine the sequence group allocated to the present cell according to the cell information such as cell ID information. Alternatively, the user terminal may determine the sequence group allocated to the present cell according to the ID information of the sequence group allocated to the present cell. Then the flow goes to Step 403. In Step 403, the user terminal uses the generated sequence for signal modulation, and transmits the modulated signal.

When the network needs to perform sequence processing, such as receiving the sequence, in Step 402, the network determines the sequence group allocated to the corresponding cell, determines the information of the sequence to be received in the sequence group of the present cell according to the occupation mode of time-frequency resources of the sequence that needs to be received, and then generates the corresponding sequence according to the information of the sequence that needs to be received. For example, the network determines the identification information of the sequence that needs to be received, and generates the corresponding sequence according to the identification information. In the present step, the network may determine the sequence group allocated to the cell according to the cell information such as cell ID information. Alternatively, the network may determine the sequence group allocated to the present cell according to the ID information of the sequence group allocated to the present cell. Then the flow goes to Step 403. In Step 403, the network uses the generated sequence for sequence reception. For example, the network uses the generated sequence and the received signal to perform correlation calculation.

In the description of the above embodiment, the cell may be allocated with one sequence group, or the cell may be allocated with a plurality of sequence groups. The allocated sequence groups are specific to the cell, i.e., different cells may be allocated with different sequence groups.

The sequences in a sequence group are determined according to the occupation modes of time-frequency resources of the sequences. The sequence group may be constituted according to the correlation between the sequences occupied the corresponding time-frequency resources. In other words, the sequences having relatively large correlation value between each other may constitute into a sequence group. The sequences having relatively large correlation value between each other refer to n sequences in the candidate sequences having the largest correlation values, where n is smaller than the total number of the candidate sequences. For example, the candidate sequences are arranged in turn from large to small with respect to the correlation value, the sequences having the first largest correlation value, the second largest correlation value, . . . , the n-th largest correlation value are n sequences having the largest correlation value, where n may be 1. With the sequence group obtained in this way, it can be ensured that the correlation value between the sequences of different sequence groups is relatively small. Thus, even in the case that the occupation modes of time-frequency resources of the sequences in different cell overlap partially each other, it can be ensured that the signal interference between the cells is relatively small.

The sequence in the sequence group in the embodiment of the invention may be CAZAC sequence. The CAZAC sequence may be Zadoff-Chu sequence, or may be General chirp-like (GCL) sequence, etc.

The formula for generating the Zadoff-Chu sequence may be as shown in Equation (1):

$$a_{r,N}(n) = W_N^{n(n+N \bmod 2)/2 + qn}, n=0, 1, \ldots, N-1; \quad \text{Equation (1)}$$

where $a_{r,N}(n)$ represents the sequence generated with index r, n represents the n-th element of the sequence, N represents the length of the sequence, $W_N = \exp(-j2\pi r/N)$, r and N are relatively prime numbers, and q is an arbitrary integer.

It can be known from Equation (1) that the length of the sequence may be controlled by using parameter N, generating of different sequences having the same length may be controlled by using index r, and q may correspond to the cyclic shift of the Zadoff-Chu sequence, or it may be considered that different q corresponds to different sequences.

In the embodiment of the invention, when the occupation mode of time-frequency resources of the sequence is employed to determine the sequence in the sequence group, the sequence in the sequence group may be determined according to the time-frequency resources of different bandwidths corresponding to different sequences, may be determined according to the time-frequency resources corresponding to different sequences that have different sampling intervals in the frequency domain and have the same bandwidth after sampling, or may be determined according to the positions of different time-frequency resource blocks corresponding to different sequences. Certainly, the sequence in the sequence group may also be determined according to other occupation modes of time-frequency resources. For example, the sequence in the sequence group may be determined according to the time-frequency resources that have different sampling intervals in the frequency domain and have different bandwidths after sampling. The embodiment of the invention does not limit the specific form of the occupation mode of time-frequency resources of the sequence.

Hereinafter, the specific implementing processes of the method for generating the sequence group, determining the sequences in the sequence group and allocating the sequence for the user/channel will be illustrated.

Embodiment I

In the case that different sequences correspond to the time-frequency resources having different bandwidths, such as in the case as shown in FIG. 2, the method for generating the sequence group and determining the sequences in the sequence group may be as follows.

It is assumed that there are totally 150 sub-carriers available in the time-frequency resources having a bandwidth of 5 MHz. There are two modes included in the occupation modes of time-frequency resources of the sequence supported by the system: in one mode, the time-frequency resources having the bandwidth of 5 MHz are divided into 4 time-frequency resources each having a bandwidth of 1.25 MHz, then the occupation mode of time-frequency resources of the CAZAC sequence is an occupation mode of time-frequency resources having a bandwidth of 1.25 MHz, i.e., the transmission bandwidth is 1.25 MHz; in the other mode, the occupation mode of time-frequency resources of the CAZAC sequence is an occupation mode of time-frequency resources having a bandwidth of 5 MHz, i.e., the transmission bandwidth is 5 MHz.

The modulation signal transmitted by a cell may employ a fragment of the CAZAC sequence or a cyclic extension of the CAZAC sequence. Generally speaking, various combinations of various sequence fragments may be employed. Especially when the number of the sub-carriers carrying the CAZAC sequence in the cell is just not a prime number, or when the cell in a cellular system needs to use a longer CAZAC sequence so as to obtain more CAZAC sequences that are different, the sequence to be transmitted may be formed by using the sequence fragment or fragment combination.

For a transmission bandwidth of 5 MHz, the length of the CAZAC sequence corresponding to the available 150 sub-carriers may be a prime number N=151, and the length of the CAZAC sequence may be intercepted as 150.

For a transmission bandwidth of 1.25 MHz, the number of available sub-carriers may be a prime number 37, then the length of the CAZAC sequence corresponding to the available 37 sub-carriers in the transmission bandwidth of 1.25 MHz may be the prime number N=37.

In the case that the occupation mode of time-frequency resources of the sequence includes two modes, i.e., a transmission bandwidth of 1.25 MHz and a transmission bandwidth of 5 MHz, and one sequence group includes two Zadoff-Chu sequences, the process of generating the sequence group and the sequences in the sequence group by using the Zadoff-Chu sequence is as follows:

A Zadoff-Chu sequence having a length of 37, the sequence index is $r=b_1 \cdot k$, where $b_1=1$, $k=1, 2, 3, \ldots, 34, 35, 36$. A Zadoff-Chu sequence having a length of 150, i.e., a fragment of a Zadoff-Chu sequence having a length of 151, the sequence index is $r=b_2 \cdot k$, where $b_2=4$, $k=1, 2, 3, \ldots, 150$. The Zadoff-Chu sequence having the length of 37 is a short sequence with respect to the Zadoff-Chu sequence having the length of 150, and the Zadoff-Chu sequence having the length of 150 is a long sequence with respect to the Zadoff-Chu sequence having the length of 37.

The long sequence may include 150 Zadoff-Chu sequences, and the short sequence may include 36 Zadoff-Chu sequences. Two Zadoff-Chu sequences having the same k constitute a sequence group, and the other two Zadoff-Chu sequences having different k constitute a different sequence group. Therefore, when it is not allowed to repeatedly use the short sequence, 36 sequence groups may be generated by performing set intersection of the above long sequence and short sequence. When it is allowed to repeatedly use the short sequence, 150 sequence groups may be generated. During the practical calculation, a module calculation may be performed for r with respect to N, where N is the length of the Zadoff-Chu sequence. When $k=\pm 37, \pm 74$, $r=(k \cdot b_1) \mod 37=0$, whereas when $r=0$, it does not correspond to a Zadoff-Chu sequence. Therefore, $k=\pm 37, \pm 74$ may be discarded. Thus, 146 sequence groups may be generated.

Generally, when different sequences occupy the time-frequency resources of different bandwidths, i.e., when the occupation modes of time-frequency resources of different sequences are different, the indexes of the long sequence and short sequence corresponding to the time-frequency resources of two different bandwidths should satisfy the following relation: $r_i=b_i \cdot k+\delta_i$, $i=1,2$; where the same k indicates the same sequence group, $b_i$, $\delta_i$ is determined by the time-frequency resources occupied by the sequence, and a special case is that $\delta_i=0$. $i=1, 2$ is used to differentiate different time-frequency resources. $b_1$, $b_2$ are determined by the proportion of the time-frequency resources occupied by the sequences. Specifically, $b_1$, $b_2$ are determined by the number of the sub-carrier occupied by the two sequences. There is a plurality of options available. A preferred option is to determine $b_1$, $b_2$ according to the equation $b_1 \cdot N_2 - b_2 \cdot N_1=1$. In other words, for an arbitrary sequence, $b_1$, $b_2$ are first determined to obtain $N_1 \cdot b_m - N_m \cdot b_1=1$, then for any $r_1=k \cdot b_1$, there is $r_m=k \cdot b_m$, $-N_1/2<k<N_1/2$. Thus, the correspondence relation between the sequences in a group is given. When a plurality of sequences in a sub-group m is to be determined, the relation is $r=k \cdot b_m \pm \delta$, where $\delta$ is a small integer.

Specifically, it is assumed that there are 3 sub-groups totally, which are Zadoff-Chu sequences having a length of 11, 23 and 37 respectively and correspond to three resource occupation modes. When $N_1=11$, then there are totally 10 sequence groups. The following table may be obtained:

| $N_1 = 11$ Group index k, $r_1$ | $N_2 = 23$ $r_2$ | $N_3 = 37$ $r_3$ | $N_1 = 11$ Group index k, $r_1$ | $N_2 = 23$ $r_2$ | $N_3 = 37$ $r_3$ |
|---|---|---|---|---|---|
| 1 | 2 | 3 | 6 | 13 | 20 |
| 2 | 4 | 7 | 7 | 15 | 24 |
| 3 | 6 | 10 | 8 | 17 | 27 |
| 4 | 8 | 13 | 9 | 19 | 30 |
| 5 | 10 | 17 | 10 | 21 | 34 |

After practical calculation, it is proved that the correlation between the sequences in the table is fairly high indeed.

For a bandwidth of 1.25 MHz, the number of sub-carriers occupied by the sequence is $N_1=37$. For a bandwidth of 5 MHz, the number of sub-carriers occupied by the sequence that is not intercepted is $N_2=151$. During the determination of $b_1$ and $b_2$, $b_1$ and $b_2$ may be determined according to a value close to 37/151, and be determined according to the equation $b_1 \cdot N_2 - b_2 \cdot N_1 = 1$, for example, $b_1=25$ and $b_2=102$; and it may be selected that $k=-L, -L+1, \ldots, -1, 1, 2, \ldots, L-1, L$, $L=(N_1-1)/2=(37-1)/2=18$, $\delta 1=0$, $\delta_2=\pm 1$, $\pm 2, \ldots$ Alternatively, it may be selected that $\delta_1=\delta_2=0$, $k=-L, -L+1, \ldots, -1, 1, 2, \ldots, L-1, L$, $L=(N_2-1)/2= (151-1)/2=75$, and $k \neq m \cdot 37$, m is an integer $m=0, \pm 1, \pm 2, \ldots$. The sequences having a length of 37 included in k and $k+m \cdot 37$ sequence groups are the same, whereas the sequences having a length of 151 included therein is not the same.

According to the embodiment of the invention, 36 sequence groups may be generated, and there may be one or more sequences having a length of 151 in each sequence group. No matter whether 36 sequence groups or 146 sequence groups are generated, different sequence group may be allocated to different cell after the sequence groups are generated.

Specifically, when the sequence in a sequence group such as a fragment of the CAZAC sequence or a cyclic extension of the CAZAC sequence is carried in a domain such as frequency domain, cyclic shift processing may be performed in the other domain for the sequence in the sequence group. The new sequence generated after cyclic shifting may be used as the sequence in this sequence group, or may be used as the sequence in the other sequence groups. For example, a fragment of the CAZAC sequence in a sequence group is carried in the frequency domain, then a discrete inverse Fourier transform may be performed on this fragment of the CAZAC sequence in the sequence group, and a time waveform is obtained, i.e., a sequence in the time domain is obtained. Then the sequence in the time domain is cyclic shifted to generate one or more sequences in the time domain, and the sequences in the time domain are used as the sequences in this sequence group or other sequence groups.

When the sequences generated by cyclic shifting a sequence are allocated to different sequence groups, it may be considered that the sequences generated after cyclic shifting are a plurality of sequences. Thus, when a sequence in a sequence group is cyclic shifted differently, different sequence groups may be obtained.

The aforementioned cyclic shifting means that a posterior segment of the sequence is copied to the anterior part of the sequence. For example, when the fragment of the original CAZAC sequence is transformed to the time domain and forms a time waveform having a length of s, i.e., a sequence $a_0, a_1, \ldots a_{s-1}$, then after the cyclic shift, it may be transformed to $a_{p+1}, a_{p+2}, \ldots, a_{s-1}, \ldots a_0, a_1, \ldots a_p$, where p may be an integer selected from 0, 1, 2, ... a−1.

In the case that the positions of the time-frequency resource blocks corresponding to different sequences are different, the method for constituting the sequence group and determining the sequence in the sequence group may be as follows.

In the embodiment of the invention, the positions of the above 4 time-frequency resource blocks having transmission bandwidths of 1.25 MHz are different. In other words, there are 4 different occupation modes of time-frequency resources. For a transmission bandwidth of 1.25 MHz, because the number of available sub-carriers may be the prime number 37, the length of the CAZAC sequences corresponding to the 37 sub-carriers available in the transmission bandwidth of 1.25 MHz may be the prime number N=37. So 36 sequence groups may be generated. The specific process of constituting the 36 sequence groups is as described in the above first embodiment. Each sequence group may include a CAZAC sequence. If the CAZAC sequence in the sequence group is used as a base sequence, and then cyclic shifting is performed on the base sequence and the sequences after cyclic shifting are still taken as the sequences in the sequence group where the corresponding base sequence exists, a plurality of sequences may be included in a sequence group. For example, 4 different cyclic shifts are performed on a base sequence, and 4 sequences are obtained after the cyclic shifts. The 4 sequences after cyclic shifting and the base sequence are used as the sequences in the same sequence group. Thus, a sequence group may include 5 sequences.

In the embodiment of the invention, it is not excluded the case that the same sequence is used for the above 4 time-frequency resource blocks of transmission bandwidths of 1.25 MHz with different position, i.e., the case that during the determination of the sequence in the sequence group, the different positions of the time-frequency resource blocks of the sequence are not considered. At this time, there may be 2 CAZAC sequences in a sequence group.

In the case that different sequences correspond to the time-frequency resources that have different sampling intervals and have the same bandwidth after sampling, such as in the case as shown in FIG. 3, the method for constituting the sequence group and determining the sequences in the sequence group may be as follows.

In the case shown in FIG. 3, the occupation modes of time-frequency resources of the sequence supported by the system include the following two modes.

Mode I: the time-frequency resources having a bandwidth of 10 MHz are divided into two time-frequency resources having a bandwidth of 5 MHz.

Mode II: Through sampling interval 2, time-frequency resources having the bandwidth of 5 MHz are obtained through sampling from the time-frequency resources having the bandwidth of 10 MHz.

Hereinafter, the Zadoff-Chu sequence is taken as an example to illustrate the Zadoff-Chu sequence generated in the same sequence group.

It is assumed that N=151, r=k, a sequence having a length of 150 is obtained through interception, and a fragment of the Zadoff-Chu sequence corresponding to the bandwidth of 5 MHz is generated.

It is assumed that N=151, r=4·k, a sequence having a length of 150 is obtained through interception, and a fragment of the Zadoff-Chu sequence corresponding to the bandwidth of 10 MHz having the sampling interval of 2 is generated.

The aforementioned k is a natural number between 1 and 150. In other words, for the transmission bandwidth of 5 MHz and the bandwidth of 10 MHz having sampling interval of 2, 150 sequence groups may be generated. The indexes of the Zadoff-Chu sequences corresponding to the time-frequency resource having different sampling intervals in the same sequence group are directly proportional to the square of the sampling intervals.

In the present embodiment, different k corresponds to the different sequence groups. There may be two CAZAC sequences in a sequence group, or more CAZAC sequences may be generated with the two CAZAC sequences through cyclic shifting. When k is the same, the sequences obtained through cyclic shifting may be regarded as the sequences in the sequence group having the value k. The CAZAC sequences obtained after cyclic shifting may be in the same sequence group as that of the base sequence. Alternatively, the CAZAC sequences obtained after cyclic shifting may be in the different sequence groups from that of the base sequence.

Generally, according to the CAZAC sequence theory, for a CAZAC sequence $a_i$, i=0, ..., M−1 having a length of M, if the sampling interval is s, and M and s are relatively prime, then $a_{(si) \bmod M}$, i=0, 1, ..., M−1 is a CAZAC sequence. For the sampling intervals $s_1$ and $s_2$, the two sequences $a_{(s_1 i) \bmod M}$, i=0, 1, ..., M−1 and $a_{(s_2 i) \bmod M}$, i=0, 1 ..., M−1 are in the same sequence group and correspond to different sampling intervals of the time-frequency resources respectively. The above Zadoff-Chu sequence is only one example.

At a certain time point, there may be two or more occupation modes of time-frequency resources of the sequence supported by the system. For example, the occupation modes of time-frequency resources of the sequence may be, as shown in FIG. 2 and FIG. 3, the sub-carriers occupying the bandwidth of 1.25 MHz, the sub-carriers occupying the bandwidth of 5 MHz, and the sub-carriers obtained having the bandwidth of 10 MHz and the sampling interval of 2 respectively. At this time, when the sequence group is allocated to each cell, the value of the index r of the sequence is as follows:

The indexes $r_i$ and $r_j$ corresponding to the different occupation modes of time-frequency resources satisfy the relation $$\frac{r_i / g_i^2}{r_j / g_j^2} = \frac{b_i}{b_j},$$

where $g_i$ and $g_j$ represent that in the two resource occupation modes, every $g_i$ sub-carriers and $g_j$ sub-carriers in the frequency domain occupy a sub-carrier, and $b_i/b_j$ represents a value determined by the ratio of the actually occupied bandwidths in the two resource occupation modes. Generally, $b_i/b_j$ may specifically be a value determined by the ratio of the numbers of sub-carriers carrying the sequences.

In the mode of the occupied sub-carriers covering the bandwidth of 1.25 MHz, N=37, then $r_1=a_1 \cdot k$, $a_1=1$, where the possible maximum k is 36. In comparison with the other two resource occupation modes, in this mode, when a selection of $a_m$, m=2, 3 is performed under the condition that $$\frac{r_i/g_i^2}{r_j/g_j^2} = \frac{b_i}{b_j}$$

is satisfied, it may select that $b_1=36$, $b_2=150$, $b_3=150$, then the following may be obtained: it needs to set $r_2=a_2\cdot k$, $a_2=4$ for the cell with occupied sub-carriers covering the bandwidth of 5 MHz, where the maximum k is 150. In comparison with the mode in which the one sub-carrier is occupied every two sub-carriers and these sub-carriers cover the bandwidth of 10 MHz, it is required that $r_3=a_3\cdot k$, $a_3=16$, where the maximum k is 150. However, in each case, there are only 36 values of r/N finally obtained that are not repeated. Therefore, when it should be satisfied that the interference is relatively small in these three cases, there are only 36 sequence groups available for allocation. Generally, the number of the sequence groups available for allocation is relevant to the number of the sequences obtained from the shortest sequence.

Through simulation, it is proved that when the time-frequency resources corresponding to the sequences in different sequence groups designed according to the embodiment of the invention are partially overlapped with each other, when the sequences are modulated in the corresponding time-frequency resources, the correlation between the modulated sequences is relatively small, and the correlation between the sequences in the same sequence group may be relatively large. Therefore, for the planning of the cellular system, when different sequence groups are allocated to the different cells, it may be ensured that the correlation between the sequences of different cells is small, and the signal interference between the cells is small.

For one certain cell, one or more sequence groups may be allocated to this cell according to the embodiment of the invention. The number of the sequence group allocated to the cell may be determined according to the actual situation of the network.

Figure 5:
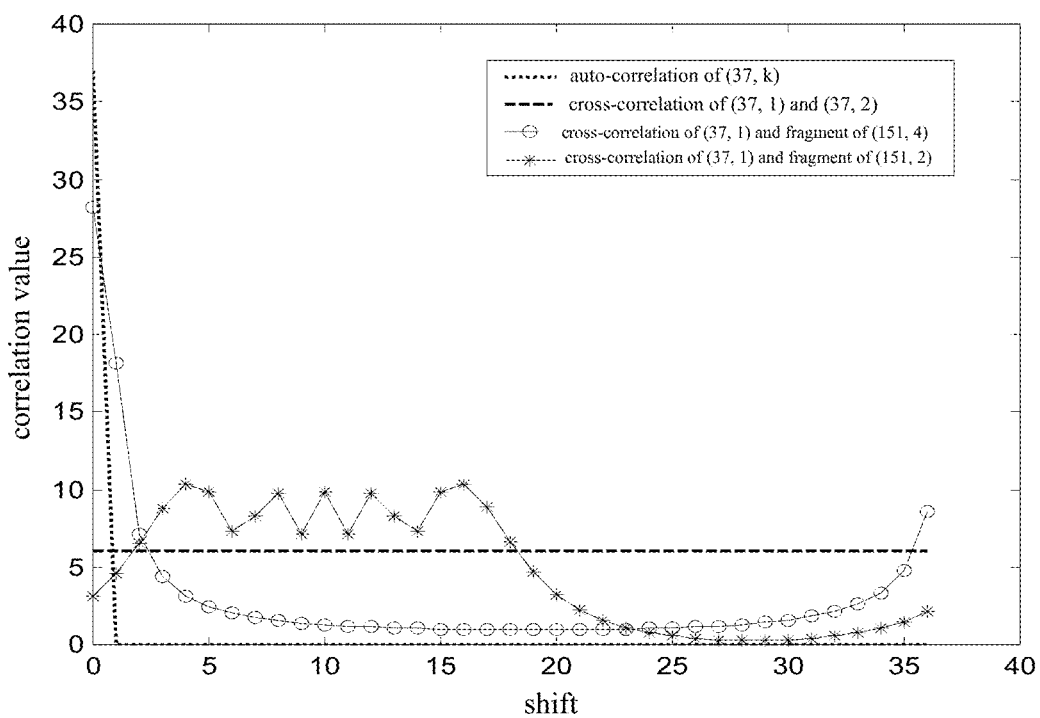
FIG. 5 is a schematic diagram showing the correlation between a short sequence and a fragment of a long sequence according to an embodiment of the present invention.

FIG. 5 shows the correlation between the sequences of two sequence groups. The (37, 1), (37, 2) etc., in FIG. 5 represent (N, r), which indicate the r-th sequence in the sequence having a length of N. It can be seen from FIG. 5 that for the sequences with N=37, the values of auto-correlation (except for the auto-correlation value of 37 in the zero shift position, the auto-correlation value is 0 in other shift positions) and the cross-correlation (the cross-correlation value is $\sqrt{37}$ in any shift positions) are very small. Whereas the correlation between the fragment of the sequence with N=37 and the fragment of the sequence with N=151 is relevant to the value of r that determines the sequence. It can be seen that there is a relatively high cross-correlation value between the sequence with N=37, r=1 and the sequence with N=151, r=4, and the largest cross-correlation value is about 28. These two sequences belong to the same sequence group. Whereas there is a relatively small cross-correlation value between the sequence with N=37, r=1 and the sequence with N=151, r=2, and the largest cross-correlation value is about 11. These two sequences belong to different sequence groups.

Figure 6:
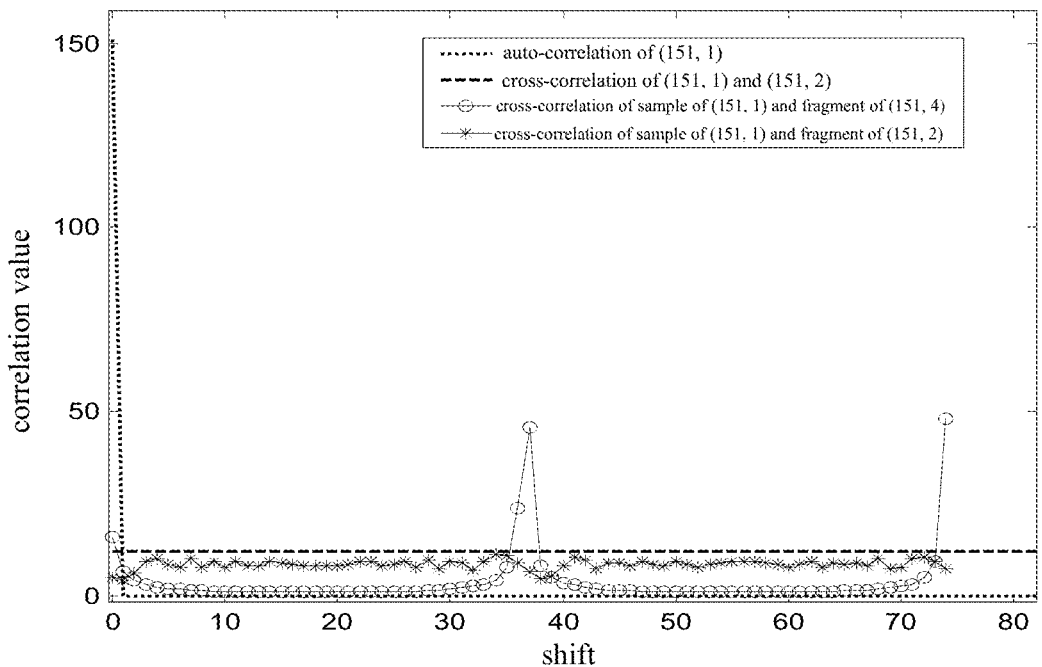
FIG. 6 is a schematic diagram showing the correlation between a sequence fragment and a sequence sample according to an embodiment of the present invention.

Similarly, FIG. 6 also shows the correlation between the sequences of two sequence groups. The (151, 1), (151, 2) etc., in FIG. 6 represent (N, r), which indicate the r-th sequence in the sequence having a length of N. It can be seen from FIG. 6 that for the sequences with N=151, the values of auto-correlation (except for the auto-correlation value of 151 in the zero shift position, the auto-correlation value is 0 in other shift positions) and the cross-correlation (the cross-correlation value is $\sqrt{151}$ in any shift positions) are very small. Whereas the correlation between the fragment having a length of 75 in the sequence with N=151 and the fragment combined after sampling is relevant to the value of r that determines the sequence. It can be seen that there is a relatively high cross-correlation value between the sequence with N=151, r=1 and the sequence with N=151, r=4, and the cross-correlation peak value about 50 appears at the two shift positions. Whereas there is a relatively small cross-correlation value between the sequence with N=151, r=1 and the sequence with N=151, r=2, and the cross-correlation values are smaller than $\sqrt{151}$ in all the shift positions, which proves that the correlation between the sequences of different sequence groups is relatively small.

Embodiment II

When there are a plurality of transmission signals having different bandwidths in the system, i.e., when the occupation modes of time-frequency resources of the sequences supported in the system are a plurality of different bandwidths, two sequences in a sequence group may be constituted with the following method.

When an occupation mode of time-frequency resources is occupation of N sub-carriers, and still a further occupation modes of time-frequency resources is occupation of M sub-carriers, then a CAZAC sequence $c_i = a_{i \bmod M} \cdot b_{i \bmod N}$, i=0, 1, . . . , MN−1 having a length of M×N may be constituted according to $a_0, a_1, \ldots a_{M-1}$ having a length of M, i.e., the sequence $a_i$, and $b_0, b_1, \ldots, b_{N-1}$ having a length of N, i.e., the sequence $b_i$, where the sequences $b_i$ and $c_i$ belong to the same sequence group.

Then, the occupation mode of time-frequency resources corresponding to the sequence $b_i$ is occupation of N sub-carriers, and the occupation mode of time-frequency resources corresponding to the sequence $c_i$ is occupation of M×N sub-carriers. When M and N are relatively prime, the sequence constructed according to the above method still satisfies the CAZAC characteristics.

For example, the above embodiment may be employed in the application scenario as shown in FIG. 2. The time-frequency resources of the bandwidth of 1.25 MHz in a cell correspond to Zadoff-Chu sequence $b_i$ having a length of 37, whereas the Zadoff-Chu sequence corresponding to the time-frequency resources in another cell is Zadoff-Chu sequence having a length of 148 which is constructed with a sequence $b_i$ having a length of 37 and a Zadoff-Chu sequence $a_i$ having a length of 4. In the practical application, in order to match the number of sub-carriers, some interception or supplement to the sequence is necessary. If both cells use the sequences corresponding to the same $b_i$, i.e., use the sequences in the same sequence group, the correlation value between the sequences are relatively large. If both cells use the sequences corresponding to different $b_i$, i.e., use the sequences in different sequence groups, the correlation value between the sequences are relatively small.

For the Zadoff-Chu sequence, it can be proved that if M and N are relatively prime, the sequence obtained with the two Zadoff-Chu sequences having lengths of M and N respectively through the above operation is a Zadoff-Chu sequence having a length of MN. The proof is as follows:

$$a_m = \exp\left[\frac{-2\pi r_1 j \cdot (m(m + M \bmod 2)/2)}{M}\right]$$

$$b_n = \exp\left[\frac{-2\pi r_2 j \cdot (n(n + N \bmod 2)/2)}{N}\right]$$

-continued $$c_i = a_{i \bmod M} \cdot b_{i \bmod N}$$
$$= \exp\left[\frac{-2\pi j \cdot \{r_1 m(m + M \bmod 2)/2 + r_2 n(n + N \bmod 2)/2\}}{MN}\right]$$
$$= \exp\left[\frac{-2\pi j \cdot \{Nr_1 i(i + M \bmod 2)/2 + Mr_2 i(i + N \bmod 2)/2\}}{MN}\right]$$
$$= \exp\left[\frac{-2\pi j \cdot \{Nr_1 i(i + M \bmod 2)/2 + Mr_2 i(i + N \bmod 2)/2\}}{MN}\right]$$
$$= \exp\left[\frac{-2\pi j \cdot \{(Nr_1 + Mr_2)i(i + MN \bmod 2)/2\}}{MN}\right]$$

The above equations are true when M and N are both odd numbers.

When there is one odd number and one even number in M and N, and the difference is only one cyclic shift, then the above equations are also true. The proof is as follows, where it is assumed that M is an odd number and N is an even number.

$$c_i = \exp\left[\frac{-2\pi j \cdot \{Nr_1 i(i + M \bmod 2)/2 + Mr_2 i(i + N \bmod 2)/2\}}{MN}\right]$$
$$= \exp\left[\frac{-2\pi j \cdot \{Nr_1 i(i + 1)(M + 1)/2 + Mr_2 i^2/2\}}{MN}\right]$$
$$= \exp\left[\frac{-2\pi j \cdot \{(Nr_1(M + 1)i^2/2 + Nr_1(M + 1)i/2 + Mr_2 i^2/2\}}{MN}\right]$$
$$= \exp\left[\frac{-2\pi j \cdot \{(Nr_1(M + 1) + Mr_2)i^2)/2\}}{MN} + \frac{2\pi j}{MN} \cdot Nr_1(N + 1)i/2\right]$$

Because $r_1$ and M are relatively prime, and $r_2$ and N are relatively prime, so $Nr_1 + Mr_2$ and $M \times N$ are relatively prime. Therefore, this sequence is a Zadoff-Chu sequence.

Generally, for a Zadoff-Chu sequence having a length of M, and $$M = \prod_i p_i^{k_i},$$

different prime numbers, then this sequence is obtained through multiplication of several Zadoff-Chu sequences having a length of $p_i^{k_i}$.

The above method may be summarized as follows: when there are three occupation modes of time-frequency resources, where one occupation mode of time-frequency resources corresponds to a short sequence a, one occupation mode of time-frequency resources corresponds to a short sequence b, and the last occupation mode of time-frequency resources corresponds to a long sequence c, and the long sequence c is obtained through the multiplication of the short sequence a and the short sequence b, then the following method may be used during the determination of the sequence in the sequence group:

The long sequence c and the short sequence b are used as the sequences in the same sequence group, and the occupation mode of time-frequency resources of the long sequence c is different from that of the short sequence b.

Certainly, the long sequence c and the short sequence a may also be used as the sequences in the same sequence group, and the occupation mode of time-frequency resources of the long sequence c is different from that of the short sequence a.

Embodiment III

In the embodiment of the invention, during the allocation of one or more sequence groups to the cell, a random allocation mode or static planning mode may be used to allocate the sequence groups to the cell. When the static planning mode is used for allocation of sequences to the cell, the sequence group allocated to the cell is fixed one or more sequences that does/do not change with time.

The implementing process of allocating the sequence group to the cell in a dynamic allocation mode is illustrated as follows.

For a system covering bandwidth of 5 MHz, the frequency band having the bandwidth of 5 MHz may be uniformly divided into 25 basic units, and the scheduling bandwidth of the signal obtained with the sequence modulation may be 1 basic unit, 2 basic units, . . . , or 25 basic units. Thus, corresponding to the combination of the basic units of these schedulable bandwidths, the sequences having 25 different lengths are required in the system. When $l_1, l_2, \ldots l_{25}$ are used to represent the respective lengths of the sequences having 25 different lengths, and the number of the sequences under each length h is represented with $N_i$, the sequences under different lengths $l_i$ may be numbered as $r_{i,0}, r_{i,1}, \ldots, r_{i,N_i-1}$. A sequence group needs to include 25 sequences, and the 25 sequences are represented as $\{r_{i,k \bmod N_i} | i=1, 2, \ldots, 25\}$, where k is the index of the sequence group, mod is the module operation, k mod $N_i$ determines the index $r_{i,*}$ of the sequence in the sub-group i of the sequence group, where *=k mod $N_i$.

In the embodiment of the invention, a pseudo random mode specific to the cell may be used to determine the sequence group allocated to the cell. For example, the present pseudo random number may be generated according to the information such as the number of the time slot where the present sequence is located and the user ID, the pseudo random number corresponds to the index k of the sequence group. Then the length of the sequence, i.e., $l_i$, is determined according to the width of the frequency band occupied by the sequence, and the index of the sequence under this length in the selected sequence group numbered k is obtained through $r_{i,k \bmod N_i}$, where mod is the module operation. In other words, the sequence group allocated to the cell may be achieved in the manner of module operation. The user terminal/network may use the sequence in the sequence group for signal processing, such as sequence transmission, sequence signal reception, etc.

The pseudo random number may be generated with a shift register. The pseudo random number sequence may be an m sequence or Gold sequence etc., in the common binary field or GF(q). Different cells may use different initial states of the shift register, or use the sequences that are differently shifted, to generate the pseudo random number sequences. The k states $(a_1, a_2, \ldots, a_k)$ of the shift register correspond to the index of the sequence group. Each time when the shift register turns, i.e., each time when the shift operation is performed, the state of the shift register is changed, so that a new state is generated. This new state may correspond to the index of the sequence group used at the next time point.

In the embodiment of the present invention, cell group specific pseudo-random mode may be used for allocation of the sequence group. For example, three cells under a Node B may be regarded as one cell group, and the three cells in the cell group may use the same pseudo random number sequence to determine the allocated sequence group. Different cells may obtain the sequences that need to be processed, such as the orthogonalized signals to be transmitted, by differently shifting the selected sequences in the time domain. Alternatively, different cells may select a sequence from the plurality of different sequences in a sequence group that correspond to the same occupation mode of time-frequency resources and have small correlation, so as to obtain the sequences that need to be processed.

When the to the cell group specific pseudo random mode is used for the allocation of the sequence group, different cell groups may use different pseudo random number sequences. For example, different cell groups of the different Node Bs may use different pseudo random number sequences.

When a plurality of sequences in the sequence group corresponds to an occupation mode of time-frequency resources, the random mode may be used to allocate the sequence to the user. For example, the occupation mode i of time-frequency resources corresponds to n sequences in the sequence group, and these n sequences are numbered with 0, 1, 2, . . . , n−1 according to an order of the index r from small to large or according to other specific order. During the processing of the sequences, the sequence corresponding to the occupation mode i of time-frequency resources is determined according to the index obtained through the module operation (X mod n), where X is a random number. The random number X may change with the change of the time slot or sub-frame occupied by the sequence. The random number X here may be a random number sequence. The sequence corresponding to the occupation mode of time-frequency resources may be a base sequence and/or a sequence generated through different cyclic shifts. Equivalently, in the embodiment of the invention, the sequence group may be divided into a plurality of sub-groups through the method of module operation, and these sequence sub-groups may be selected and allocated in the pseudo random manner.

In the embodiment of the invention, the process of constitution and allocation of the sequence group may be performed with respect to some occupation modes of time-frequency resources of the sequences in the system, i.e., the constitution process of the sequence group may not be performed for all the occupation modes of time-frequency resources of the sequences in the system. For example, according to the length of the sequence, the occupation modes of time-frequency resources of the sequences may be classified into several classes, the set of the occupation modes of time-frequency resources of the sequences in each class corresponds to the sequences having lengths within a certain range. The above processing of generation and allocation of the sequence group may be performed for the sequences corresponding to the set in each class.

For the sequence groups corresponding to the set of different occupation modes of time-frequency resources of the sequences, the dynamic or static allocation mode may be used respectively to allocate different sequence groups to the cell. For example, when the wireless resources occupied by the sequence are relatively few, the dynamic allocation mode may be used to allocate the sequence groups to the cell. Because at this time, the length of the sequence is relatively small, the index of the sequence group is relatively small, the requirements of using the sequences by the cell can be satisfied when the dynamic allocation mode is used to allocate the sequence groups to the cell. The implementation process of allocating the sequence groups to the cell in the dynamic allocation mode is as follows: in the embodiment where the Zadoff-Chu sequence is taken as an example, one of pseudo random modes is used; during the transmission of the signal modulated with the sequence, an index of the sequence group is selected randomly, and then one of the modes in the above description is used to calculate the sequence with the sequence index r which belongs to the sub-group of the corresponding length in the same sequence group.

In another example, when the sequence occupies many wireless resources, the static allocation mode is used to allocate the sequence groups to the cell. For example, in the embodiment where the Zadoff-Chu sequence is used as an example, if the number N of the sequence groups can satisfy the requirements of the cell to use the sequences, the N sequence groups are allocated to different cells for using. At this time, the sequence groups allocated to the cell does not need to change as the time changes, and the requirements of averaging the signal interferences between the cells can also be satisfied.

Preferably, the wireless resources occupied by the sequence may be classified into two classes in the system, and sequence groups are constituted respectively. In one class, the sequence occupies many wireless resources, and the static allocation mode may be used to allocate sequence groups to the cell for this class. In the other class, the sequence occupies few wireless resources, and the dynamic pseudo random mode may be used to allocate sequence groups to the cell for this class. For example, when the time-frequency resources occupied by the sequence exceed 144 sub-carriers, the length of this sequence is larger than or equal to 144. For the case that the time-frequency resources occupied by the sequence exceed 144 sub-carriers, the static allocation mode may be used to allocate sequence groups to the cell. When the time-frequency resources occupied by the sequence are less than 144 sub-carriers, the length of this sequence is smaller than 144. For the case that the time-frequency resources occupied by the sequence are less than 144 sub-carriers, the dynamic pseudo random mode may be used to allocate sequence groups to the cell.

In the above embodiment, the processes of generating the sequence group and constituting the sequence in the sequence group is implemented according to different occupation modes of time-frequency resources of the sequence supported in the system as well as the rules such as static or dynamic allocation. The operations of generating the sequence group and constituting the sequence in the sequence group described in the above embodiment of the invention may be implemented for all the cells in the system. At this time, the mode of generating the sequence group and constituting the sequence in the sequence group may be referred to as a common grouping mode of the cell. However, because when a sequence is to be selected for usage, the selection of the sequence group may be performed according to the cell specific pseudo random mode, and the random number sequence specific to the cell may hop in the different time slots where the CAZAC sequences are carried, so a certain short sequence will not always appear together with a certain long sequence in the neighboring cell. Thus, when viewed in a long period of time, the signal interference between the cells is random, so that the strong signal interference between two cells may be avoided.

The above embodiments are illustrated by taking it as an example that the sequence in the sequence group is the CAZAC sequence generated from Zadoff-Chu sequence. However, the sequence in the embodiment of the invention may also be the CAZAC sequence generated through other sequence generating methods. For example, the CAZAC sequence may also be generated with Generalized Chirplike Sequence (GCL sequence). The GCL sequence can be represented as follows:

$$c(n)=a(n)b(n \bmod m), n=0, 1, \ldots N-1.$$

Where N=sm², s and m are both positive integers; {b(n)} is a "modulation" sequence, the m elements in this sequence are all complex numbers with module of 1, such as DFT sequence, $b_i(n)=W_m^{in}$, i, n=0, 1, ..., m−1. {a(n)} is a special "carrier" sequence, which may be a Zadoff-Chu sequence. Further, {b(n)} may also be Hadarmard sequence, i.e., {b(n)} is one row of Hadarmard matrix. An m-order Hadarmard matrix $H_m$ is an m×m-order matrix. The elements of the matrix are constituted of 1 and −1, where the matrix Hm satisfies the following formula: $H_m H_m^T = mI$, where I is a unit matrix, and T represents a matrix transposition. When m=2ⁿ, and n is a positive integer, the Hadarmard sequence is as follows:

$$b_i(n) = (-1)^{\sum_{l=0}^{m-1} i_l n_l}, i, k = 0, 1, \ldots, m-1$$

Where $i_l$, $n_l$ are the l-th bit of the binary representation of i, n having a length of m bits, respectively.

In the case of the CAZAC sequence generated by using the GCL sequence, the specific implementing processes for generating the sequence group and allocating the sequences to the cells are basically the same as the implementing process described in the above embodiment, and will thus not be illustrated in detail again.

Another point that should be particularly pointed out is that the CAZAC sequence in the above embodiments may also be a sequence generated by performing interception on a CAZAC sequence, or may be a sequence generated by combining a fragment of a CAZAC sequence with a CAZAC sequence.

Embodiment IV

Figure 7:
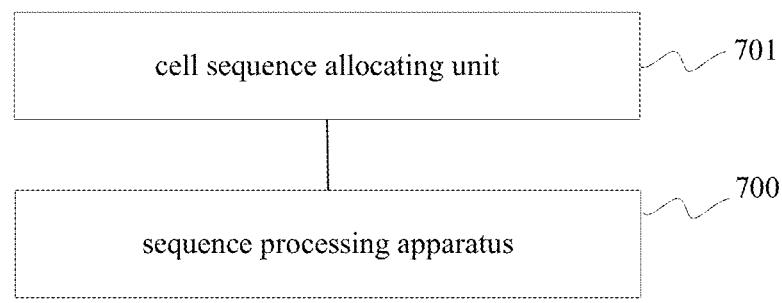
FIG. 7 is a schematic diagram showing the structure of a communication system according to an embodiment of the present invention.

The above embodiments of the method may be implemented with a communication system shown in FIG. 7, where the system includes a sequence allocating unit 701, and a sequence processing apparatus 700 which includes cell sequence determining unit 702, a time-frequency resource sequence determining unit 703, a sequence generating unit 704, and a processing unit 705.

The sequence allocating unit 701 is adapted to allocate a sequence group containing a plurality of sequences to a cell, and determine the sequences in the sequence group according to the occupation modes of time-frequency resources of the sequence supported in the system. The sequence group, occupation modes of the time-frequency resources and so on, are as described in the above embodiments of the method.

The cell sequence determining unit 702 is adapted to determine the available sequence group, such as determine the available sequence group according to the information of the cell or the identification information of the sequence group. The cell sequence determining unit 702 may employ a plurality of modes as described in the above embodiments of method to determine a sequence that needs to be generated, which will not be illustrated again here.

The time-frequency resource sequence determining unit 703 is adapted to determine the sequence that needs to be generated from the sequence group determined by the cell sequence determining unit 702 according to the occupation mode of the time-frequency resources. The time-frequency resource sequence determining unit 703 may employ a plurality of methods for determining the sequence that needs to be generated as described in the above embodiments of method to determine a sequence that needs to be generated, which will not be illustrated again here.

The sequence generating unit 704 is adapted to generate the sequence determined by the time-frequency resource sequence determining unit 703.

The processing unit 705 is adapted to transmit the sequence generated by the sequence generating unit 704 on corresponding time-frequency resources, or use the sequence generated by the sequence generating unit 704 in the processing of the sequence received on the corresponding time-frequency resources, such as in correlation calculation at the receiver.

The specific implementation is as described in the above embodiments of method.

The above system includes a wireless communication sequence allocating apparatus, which includes a sequence allocating unit 701 adapted to allocate sequence group for the cell, and determine the sequences in the sequence group according to the modes of time-frequency resources supported in the system which are used to carry the sequences.

Figure 8:
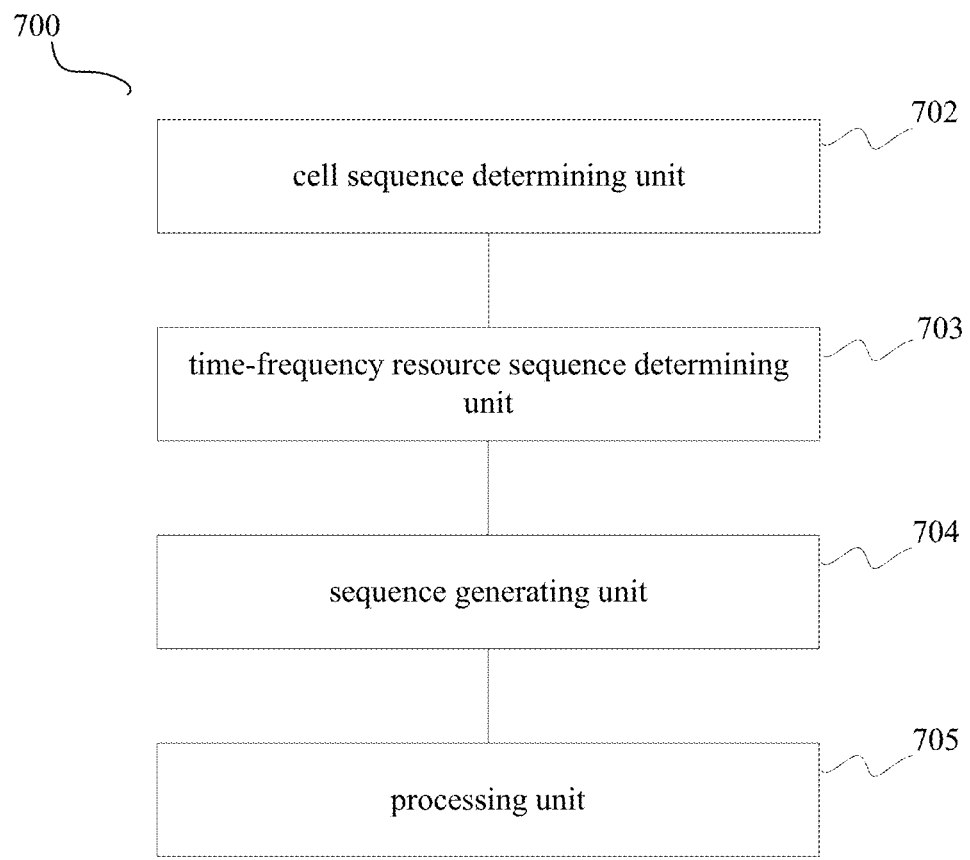
FIG. 8 is a schematic diagram showing the structure of an apparatus in a communication system according to an embodiment of the present invention.

The above system further includes a sequence processing apparatus in the wireless communication system for determining and processing the sequence. As shown in FIG. 8, the sequence processing apparatus 700 includes: the cell sequence determining unit 702, the time-frequency resource sequence determining unit 703, the sequence generating unit 704 and the processing unit 705.

Those skilled in the art can understand that all or part of the steps for implementing the method in the embodiment may be implemented by instructing relevant hardware via a program, and the program may be stored in a computer readable storage medium. For example, when the program is run, the following steps may be included: generating a sequence group including a plurality of sequences, where the sequences in the sequence group are determined according to the occupation mode of time-frequency resources of the sequence supported by the system; and allocating the sequence group to the cell. The storage medium may be ROM/RAM, magnetic disc, optical disc, and so on.

The scope of protection of the present invention is defined by the scope of protection of the claims. Various variations and amendments to the present invention made by those skilled in the art without departing from the spirit and scope of the present invention fall within the scope of protection of the claims of the present invention.

What is claimed is:

1. A method, comprising:
identifying, by a communication apparatus, a sequence group of a cell, wherein the sequence group comprises a plurality of sub-groups, each sub-group comprises at least one sequence, and each sub-group in the sequence group corresponds to a different time-frequency resource occupation mode of the at least one sequence;
determining, by the communication apparatus, sequence generation information of a first sequence in a first sub-group of the sequence group, based on a time-frequency resource occupation mode corresponding to the first sub-group; and
generating, by the communication apparatus according to the sequence generation information, a second sequence corresponding to the first sequence,
wherein, based on the second sequence, a signal is generated for transmission to another communication apparatus, or a signal received from the other communication apparatus is processed.

2. The method according to claim 1, wherein the communication apparatus is a terminal device, and the other communication apparatus is a network device, and the method further comprises:
- generating, by the terminal device, the signal according to the second sequence; and
- transmitting, by the terminal device, the signal to the network device.

3. The method according to claim 1, wherein the communication apparatus is a network device, and the other communication apparatus is a terminal device, and the method further comprises:
- receiving, by the network device, the signal from the terminal device; and
- processing, by the network device, the received signal based on the second sequence.

4. The method according to claim 1, wherein the identifying the sequence group of the cell comprises:
- determining the sequence group of the cell according to identification information of the cell.

5. The method according to claim 4, wherein at least one sequence in the sequence group that corresponds to a first bandwidth of the time-frequency resources has a higher correlation with another sequence in the same sequence group that corresponds to a second bandwidth of the time-frequency resources than with a sequence in another sequence group that corresponds to the second bandwidth of the time-frequency resources, and the first bandwidth is different from the second bandwidth.

6. The method according to claim 1, wherein sequences in the sequence group of the cell comprise one or more of the following:
- a constant amplitude zero auto-correlation (CAZAC) sequence,
- a fragment of a CAZAC sequence, and
- a sequence obtained through combining a CAZAC sequence with a segment of a CAZAC sequence.

7. The method according to claim 6, wherein the CAZAC sequence is a Zadoff-Chu sequence.

8. The method according to claim 7, wherein the sequence generation information of the first sequence is an index of a Zadoff-Chu sequence.

9. The method according to claim 7, wherein two different sequences, corresponding to different time-frequency resource occupation modes, whose indexes are r1, r2, are in the sequence group, and the indexes r1 and r2 comply with $r1=(k*b1) \bmod N1$ and $r2=(k*b2) \bmod N2$; and wherein the same k indicates the two different sequences belong to a same sequence group, N1 and N2 represents lengths of the two sequences respectively, and b1 and b2 comply with an equation $b1*N2-b2*N1=1$.

10. The method according to claim 9, wherein $-N1*0.5<k<N1*0.5$.

11. A communication apparatus, comprising:
- at least one processor and a memory storing program instructions for execution by the processor,
- wherein the instructions, when executed by the processor, cause the communication apparatus to:
- identify a sequence group of a cell, wherein the sequence group comprises a plurality of sub-groups, each sub-group comprises at least one sequence, and each sub-group in the sequence group corresponds to a different time-frequency resource occupation mode of the at least one sequence;
- determine sequence generation information of a first sequence in a first sub-group of the sequence group, based on a time-frequency resource occupation mode corresponding to the first sub-group; and
- generate, according to the sequence generation information, a second sequence corresponding to the first sequence,
- wherein, based on the first sequence, a signal is generated for transmission to another communication apparatus, or a signal received from the other communication apparatus is processed.

12. The communication apparatus according to claim 11, wherein the communication apparatus is implemented in a terminal device, and the other communication apparatus is implemented in a network device, and wherein the instructions, when executed by the processor, further cause the communication apparatus to:
- generate the signal according to the second sequence; and
- transmit the signal to the network device.

13. The communication apparatus according to claim 11, wherein the communication apparatus is implemented in a network device, the other communication apparatus is implemented in a terminal device, and wherein
- the instructions, when executed by the processor, further cause the communication apparatus to:
- receive the signal from the terminal device; and
- process the received signal based on the second sequence.

14. The communication apparatus according to claim 11, wherein in identifying the sequence group of the cell, the instructions cause the communication apparatus to:
- determine the sequence group of the cell according to identification information of the cell.

15. The communication apparatus according to claim 14, wherein at least one sequence in the sequence group that corresponds to a first bandwidth of the time-frequency resources has a higher correlation with another sequence in the same sequence group that corresponds to a second bandwidth of the time-frequency resources than with a sequence in another sequence group that corresponds to the second bandwidth of the time-frequency resources, and the first bandwidth is different from the second bandwidth.

16. The communication apparatus according to claim 11, wherein sequences in the sequence group of the cell comprise one or more of the following:
- a constant amplitude zero auto-correlation (CAZAC) sequence,
- a fragment of a CAZAC sequence, and
- a sequence obtained through combining a CAZAC sequence with a segment of a CAZAC sequence.

17. The apparatus according to claim 16, wherein the CAZAC sequence is a Zadoff-Chu sequence.

18. The apparatus according to claim 17, wherein the sequence generation information of the first sequence is an index of a Zadoff-Chu sequence.

19. The apparatus according to claim 17, wherein two different sequences, corresponding to different time-frequency resource occupation modes, whose indexes are r1, r2, are in the sequence group, and the indexes r1 and r2 comply with $r1=(k*b1) \bmod N1$ and $r2=(k*b2) \bmod N2$; and wherein the same k indicates the two different sequences belong to a same sequence group, N1 and N2 represents lengths of the two sequences respectively, and b1 and b2 comply with an equation $b1*N2-b2*N1=1$.

20. A non-transitory computer-readable storage medium storing instructions that, when executed by a processor of a communication apparatus, cause the communication apparatus to:
- identify a sequence group of a cell, wherein the sequence group comprises a plurality of sub-group comprises at least one sequence, and each sub-group in the sequence group corresponds to a different time-frequency resource occupation mode of the at least one sequence;

determine sequence generation information of a first sequence in a first sub-group of the sequence group based on a time-frequency resource occupation mode corresponding to the first sub-group; and generate, according to the sequence generation information, a second sequence corresponding to the first sequence, wherein, based on the first sequence, a signal is generated for transmission to another communication apparatus, or a signal received from the other communication apparatus is processed.

* * * * *